United States Patent

[11] 3,576,095

[72] Inventor Richard D. Rivers
 Louisville, Ky.
[21] Appl. No. 854,173
[22] Filed Aug. 29, 1969
[45] Patented Apr. 27, 1971
[73] Assignee American Air Filter Company, Inc.
 Louisville, Ky.

[54] UNIT FILTER ASSEMBLY
 5 Claims, 4 Drawing Figs.

[52] U.S. Cl. .................................... 55/484,
 55/516, 55/521
[51] Int. Cl. ................................... B01d 25/06
[50] Field of Search .......................... 55/483,
 484, 512, 513, 515—519, 521, 387

[56] References Cited
UNITED STATES PATENTS
3,186,149  6/1965  Ayers ............................ 55/387
3,354,623  11/1967 Keller ............................ 55/484

Primary Examiner—Frank W. Lutter
Assistant Examiner—Bernard Nozick
Attorney—Ralph B. Brick ABSTRACT: A unit filter assembly including filter media plenum chambers formed by interrelated sets of U-shaped members having perforated flanks with interlaced, notched flange portions extending outwardly from the flanks to space such flanks and form plenum chambers therebetween.

PATENTED APR 27 1971 3,576,095
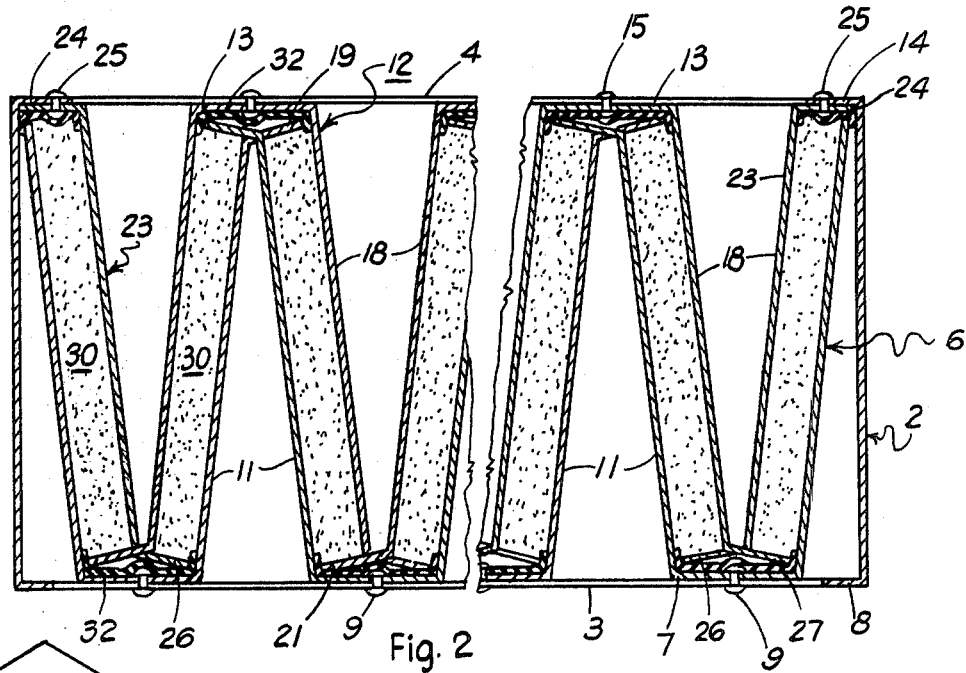
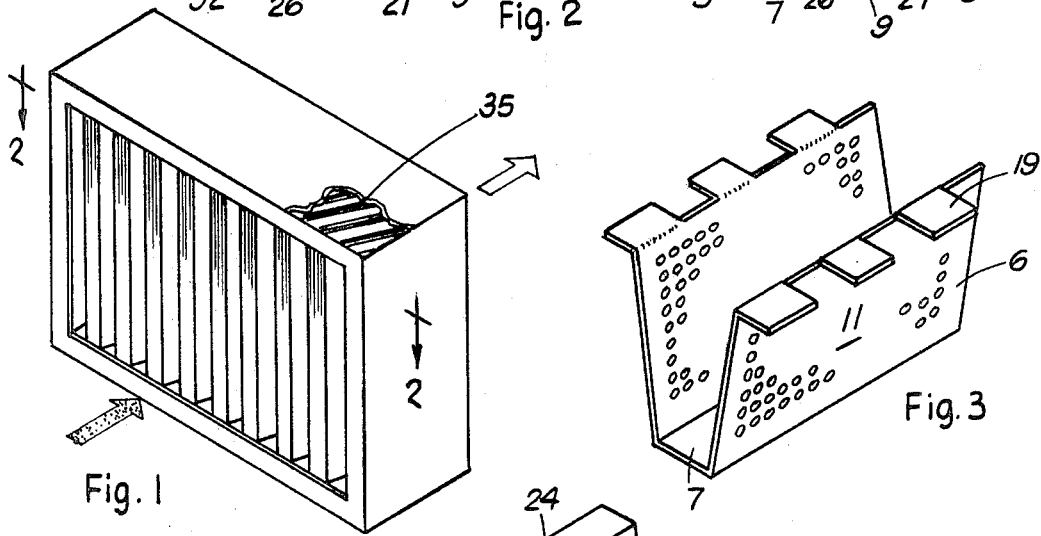
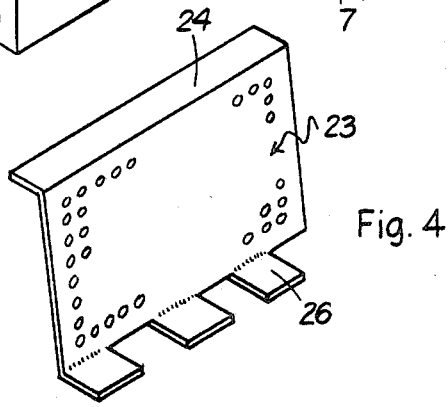
INVENTOR.
Richard D. Rivers
BY
Ralph B. Brick
ATTORNEY

UNIT FILTER ASSEMBLY

BACKGROUND OF THE INVENTION

The present invention relates to gas-separating apparatus and more particularly to an apparatus including a plurality of spaced media containing plenum chambers arranged for parallel flow of the gas to be treated.

In accordance with the present invention, an improved modification of a unit filter assembly of the type like that set forth in assignee's U.S. Pat. No. 3,354,623, issued to J.R. Keller on Nov. 28, 1967, is provided.

SUMMARY OF THE INVENTION

The present invention provides a novel structure modification for plenum-type unit filters which is economical and straightforward and which reduces the parts required, minimizing tooling and assembly steps and enhancing the stability of the overall arrangement. In addition, the present invention provides a filter construction which can be readily manipulated for assembly and installation and which can be readily adapted to use with particulate materials of various types.

Various other features of the present invention will become obvious to one skilled in the art upon reading the disclosure set forth hereinafter.

More particularly, the present invention provides a unit filter assembly comprising: an open-ended frame member having an upstream dirty gas inlet and a downstream clean gas outlet; a first set of spaced, longitudinally extending plenum-forming members of substantially U-shaped cross section disposed within the frame member, each having a base portion extending transversely across the dirty gas inlet and having perforated flank portions extending from the dirty gas inlet toward the clean gas outlet; a second set of spaced, longitudinally extending plenum-forming members of substantially U-shaped cross section disposed within the frame member, each having a base portion extending transversely across the clean gas outlet and having perforated flank portions extending from the clean gas outlet toward the dirty gas inlet, the flank portions of the first and second sets of plenum-forming members having outwardly turned notched flange members of smaller extent than the base portion with the notched flange members of adjacent plenum-forming members of each set being interlaced and engaging against flank portions of an opposite set of plenum-forming members to space adjacent flank portions of the first and second sets, forming perforated plenum chambers therebetween; and filter media material disposed within the perforated chambers in sufficient quantities to substantially fill the same.

It is to be understood that various changes can be made in the arrangement, form and construction of the apparatus disclosed herein without departing from the scope or spirit of the present invention.

Referring to the drawing which discloses one advantageous embodiment of the present invention:

FIG. 1 is an isometric view of the novel unit filter assembly;

FIG. 2 is an enlarged, broken cross-sectional view taken in a plane passing through line 2–2 of FIG. 1, disclosing a portion of the assembly of FIG. 1;

FIG. 3 is a reduced isometric view of a U-shaped plenum-forming member utilized in construction of the assembly of FIGS. 1 and 2; and FIG. 4 is an isometric view of a perforated end plate member utilized in the construction of the assembly of FIGS. 1 and 2.

As can be seen in FIG. 1 of the drawing, the inventive assembly includes open-ended rectangular frame member 2 having upstream dirty gas inlet 3 and downstream clean gas outlet 4. Frame member 2 can be formed from any one of a number of suitable materials such as wood or metal, and although advantageously shown in rectangular form, can be of other geometric configurations.

As can be seen more readily in FIGS. 2 to 4 of the drawing, to form plenum chambers in frame member 2, a first set of longitudinally extending plenum-forming members 6 (FIG. 3) of substantially U-shaped cross section is provided. These plenum-forming members can be made of a suitable rigid and flexible material, and advantageously, thin perforated metal sheets have been found suitable for this purpose. Each plenum-forming member 6 of the first set has its base portion 7 extending transverse the upstream face 3 of frame member 2 with the end extremities of the base portion being fastened to the upstream peripheral border 8 of frame 2 by means of suitable rivets 9. It is to be noted that plenum-forming members 6 have perforated flank portions 11 extending from dirty gas inlet 3 toward clean gas outlet 4 in diverging fashion.

A second set of longitudinally extending plenum-forming members 12 of substantially U-shaped cross section of substantially the same configuration as the first set as well as of the same material is provided. Each plenum-forming member 12 of the second set has its base portion 13 extending transverse the downstream face 4 of the frame member 2 with the end extremities of the base portion being fast to the downstream peripheral border 14 of frame 2 by means of suitable rivets 15 in a manner similar to the fastening aforedescribed for base portions 7 on the upstream peripheral border frame 8. Like plenum-forming members 6, plenum-forming members 12 have perforated flank portions 18. These flank portions 18 extend from the clean gas outlet 4 toward dirty gas inlet 3 in diverging fashion parallel to and in spaced relationship with flank portions 11 of the first plenum-forming member 6. In this connection, it is to be noted that in order to keep the flank portions of the two plenum-forming sets in such spaced parallel relationship, the ends of each of the perforated flank portions 11 and 18 of the first and second sets 6 and 12 respectively, are provided with integral end flange members 19 and 21, respectively, which are outwardly turned to extend toward the flank portions of the opposite set. It also is to be noted that flange members 19 and 21 are notched, with the notches so sized and spaced that the notched flange members of adjacent plenum-forming members of each set can be interlaced to engage against the flank portions of an opposite set as aforedescribed. Accordingly, the present invention provides an arrangement which can be readily formed on conventional forming machinery, and which at the same time, due to the interlacing of the flange members presents a sturdy, firm structure. It will be noted that, advantageously, the plenum-forming members of each set can be identical in configuration with the flange members extending from the flank portions having notches so disposed that it is only necessary that adjacent interlaced plenum-forming members be placed in reverse end-to-end relation.

It further is to be noted, in the embodiment disclosed, that there is one more plenum-forming member 6 in the first set than there is a plenum-forming member 12 in the second set with the end flank portions of set 6 being free of flange members 19. Accordingly, perforated end flank plates 23 (FIG. 4) extending parallel to and spaced from perforated flank portions 11 of end plenum-forming members 6 of the first set are provided. These perforated end flank plates 23 each include an unnotched end portion 24 abutting the downstream peripheral border 14 and fastened thereto by means of rivets 25. The other end of each end flank plate 23 is provided with a notched end flange 26 which can be interlaced with the end flanges of adjacent end flank portions of plenum-forming members 12 to space the perforated end flange plates from the end flanks of plenum-forming members 6 and form the end plenums.

With the arrangement aforedescribed, it can be seen that a plurality of perforated plenum-chambers 30 are formed which extend in V-shaped pleat bank form across the open end of frame member 2. It is to be noted that suitable sealing gaskets 32, which can be of a soft, compressible material such as rubber can be fastened to the base portions 7 and 13 of each of the plenum-forming members 6 and 12 to seal the end flange members 19 and 21 in their engagement against the flank portions. It also is to be noted that the opposite inner walls of frame member 2 against which the edges of plenum-forming members 6 and 12 abut can be provided with a sheet of soft, compressible and pliable sealing gasket material 35 such as rubber to receive and seal such edges.

A suitable particulate filter media material, such as activated carbon, can be poured into plenums 30 when they are formed, the media material being supplied in sufficient quantities to substantially fill the same. In this connection it is to be noted that sealing gasket 35 can be of sufficient thickness and sufficient compressibility to yieldingly engage against and insure a certain amount of compressibility of the particulate media material disposed in the plenum chambers to accommodate any settling of such particulate material.

Thus, in accordance with the present invention, a filter assembly arrangement is provided which is straightforward, economical and efficient in its construction, requiring a minimum of structural parts and insuring stability and ready manipulation for installation and removal of particulate material.

I claim:

1. A unit filter assembly comprising an open-ended frame member having an upstream dirty gas inlet and a downstream clean gas outlet; a first set of spaced, longitudinally extending plenum-forming members of substantially U-shaped cross section disposed within said frame member, each having a base portion extending transversely across said dirty gas inlet and having perforated flank portions extending from said dirty gas inlet toward said clean gas outlet; a second set of spaced, longitudinally extending plenum-forming members of substantially U-shaped cross section disposed within said frame member, each having a base portion extending transversely across said clean gas outlet and having perforated flank portions extending from said clean gas outlet toward said dirty gas inlet, the flank portions of the plenum-forming member of said first and second sets having outwardly turned notched flange members of smaller extent than said base portions with the notched flanged members of adjacent plenum-forming members of each set being interlaced and extending substantially adjacent to flank portions of an opposite set of plenum-forming members to space adjacent flank portions of said first and second sets, forming perforated plenum chambers therebetween; and filter media material disposed within said perforated plenum chambers in sufficient quantities to substantially fill the same.

2. The apparatus of claim 1, said first and second sets of plenum-forming members differing in number by one with the set of greater number being free of said flange members on end flank portions and with the set of lesser number including perforated end flank plates having outwardly turned notched flange members of smaller extent than said base portion interlaced with the notched flanged member of an adjacent plenum-forming member to engage against the flank portions of the other set, forming perforated plenum chambers therebetween.

3. The apparatus of claim 1, said plenum-forming members of U-shaped cross section of a set being identical in configuration, said flange members on said flank portions thereof having their notches so disposed that adjacent plenum-forming members are in reverse end-to-end relation.

4. The apparatus of claim 1, said outwardly turned flange members being positioned at the extremities of said flank portions opposite said base portions.

5. The apparatus of claim 4, and sealing gasket means fastened to said base portions of a set of plenum-forming members to sealingly cooperate with the outwardly turned flange members of the opposite set of plenum-forming members.